(12) United States Patent
Corsmeier (10) Patent No.: US 10,816,199 B2
(45) Date of Patent: Oct. 27, 2020

(54) COMBUSTOR HEAT SHIELD AND ATTACHMENT FEATURES

(71) Applicant: General Electric Company, Schenectady, NY (US)

(72) Inventor: Donald Michael Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 15/417,381

(22) Filed: Jan. 27, 2017

(65) Prior Publication Data
US 2019/0003710 A1    Jan. 3, 2019

(51) Int. Cl.
    F23R 3/00         (2006.01)
    F23R 3/28         (2006.01)
    (Continued)

(52) U.S. Cl.
    CPC .............. *F23R 3/007* (2013.01); *F23R 3/002* (2013.01); *F23R 3/10* (2013.01); *F23R 3/283* (2013.01);
    (Continued)

(58) Field of Classification Search
    CPC .. F02C 7/142; F02C 7/185; F02C 7/08; F02C 6/08; F04D 29/441; F04D 29/5826; F04D 29/40; F04D 29/424; F04D 29/4226; F04D 29/4246; F04D 27/2015; F04D 15/0011; F23R 2900/00017; F23R 2900/00018;
    (Continued)

(56) References Cited

U.S. PATENT DOCUMENTS 3,842,595 A   10/1974  Smith et al.
4,686,823 A    8/1987  Coburn et al.
              (Continued)

FOREIGN PATENT DOCUMENTS

EP    2466074        6/2012
FR    2825778 A1    12/2002
FR    2935465 A1     3/2010

OTHER PUBLICATIONS

U.S. Appl. No. 15/053,522, filed Feb. 25, 2016.
(Continued)

*Primary Examiner* — Gerald L Sung
*Assistant Examiner* — Jacek Lisowski
(74) *Attorney, Agent, or Firm* — Dority & Manning, P.A.

(57) ABSTRACT

Combustor assemblies and combustor heat shields are provided. As one example, a combustor assembly comprises a flow path assembly including an outer wall, an inner wall, and a combustor dome that define a combustion chamber and are formed from a ceramic matrix composite (CMC) material. The combustor dome defines a plurality of dome openings, and a heat shield is positioned between the combustor dome and the combustion chamber that comprises a plurality of heat shield segments. Each heat shield segment defines a heat shield aperture that is aligned with a dome opening, and an aft surface of each segment is concave and a forward surface of each segment is convex. One of a plurality of fuel-air mixers is positioned through each heat shield aperture and dome opening, and one collar of a plurality of collars extends through each heat shield aperture to couple the heat shield to the fuel-air mixer.

17 Claims, 6 Drawing Sheets

(51) Int. Cl.
*F23R 3/60* (2006.01)
*F23R 3/50* (2006.01)
*F23R 3/10* (2006.01)

(52) U.S. Cl.
CPC .............. *F23R 3/286* (2013.01); *F23R 3/50* (2013.01); *F23R 3/60* (2013.01)

(58) Field of Classification Search
CPC .. F23R 2900/03044; F23R 3/007; F23R 3/02; F23R 3/286; F23R 3/002; F23R 3/60; F23R 3/283; F01D 5/06; F01D 5/225; F01D 9/023
See application file for complete search history.

(56) References Cited

U.S. PATENT DOCUMENTS

| | | | |
|---|---|---|---|
| 4,934,145 A * | 6/1990 | Zeisser | F23R 3/002 60/740 |
| 5,463,864 A * | 11/1995 | Butler | F23R 3/283 60/796 |
| 5,465,571 A | 11/1995 | Clark | |
| 5,630,319 A * | 5/1997 | Schilling | F23R 3/10 60/747 |
| 5,630,700 A | 5/1997 | Olsen et al. | |
| 5,953,919 A * | 9/1999 | Meylan | F01D 9/044 60/752 |
| 6,530,744 B2 * | 3/2003 | Liotta | F01D 9/041 415/115 |
| 6,893,214 B2 | 5/2005 | Alford et al. | |
| 6,991,427 B2 | 1/2006 | Scott | |
| 7,062,920 B2 | 6/2006 | McMasters et al. | |
| 7,186,078 B2 | 3/2007 | Tanaka | |
| 7,249,462 B2 | 7/2007 | Aumont et al. | |
| 7,329,087 B2 | 2/2008 | Cairo et al. | |
| 7,445,425 B2 | 11/2008 | Ferra et al. | |
| 7,464,554 B2 | 12/2008 | Cheung et al. | |
| 7,478,534 B2 * | 1/2009 | Guezengar | F23R 3/002 60/748 |
| 7,950,234 B2 | 5/2011 | Radonovich et al. | |
| 8,141,371 B1 | 3/2012 | Habarou et al. | |
| 8,240,980 B1 | 8/2012 | Liang | |
| 8,668,437 B1 * | 3/2014 | Liang | F01D 5/14 415/115 |
| 8,753,073 B2 | 6/2014 | Albers et al. | |
| 8,756,935 B2 | 6/2014 | Duval et al. | |
| 8,763,406 B2 | 7/2014 | Pieussergues et al. | |
| 8,776,525 B2 | 7/2014 | Oechsle | |
| 8,905,711 B2 | 12/2014 | Suciu et al. | |
| 8,943,835 B2 | 2/2015 | Corsmeier et al. | |
| 9,039,364 B2 | 5/2015 | Alvanos et al. | |
| 9,169,736 B2 | 10/2015 | Hayford et al. | |
| 9,255,487 B2 | 2/2016 | Mayer et al. | |
| 10,393,381 B2 * | 8/2019 | Noe | |
| 2002/0076541 A1 * | 6/2002 | Jarmon | C04B 35/806 428/312.6 |
| 2006/0010879 A1 * | 1/2006 | Aumont | F01D 9/023 60/796 |
| 2006/0123797 A1 * | 6/2006 | Zborovsky | F01D 9/041 60/800 |
| 2007/0256418 A1 * | 11/2007 | Mueller | F23R 3/00 60/752 |
| 2010/0194179 A1 | 8/2010 | Waltz | |
| 2010/0326078 A1 | 12/2010 | Pieussergues et al. | |
| 2011/0271684 A1 | 11/2011 | Corsmeier et al. | |
| 2013/0000324 A1 | 1/2013 | Alvanos et al. | |
| 2013/0192233 A1 * | 8/2013 | Eastwood | F23R 3/002 60/752 |
| 2014/0026580 A1 * | 1/2014 | Pardington | F23R 3/14 60/748 |
| 2014/0271144 A1 | 9/2014 | Landwehr et al. | |
| 2015/0107109 A1 | 4/2015 | Corsmeier et al. | |
| 2015/0204447 A1 | 7/2015 | Kloepfer | |
| 2015/0260404 A1 | 9/2015 | Sullivan | |
| 2016/0102574 A1 | 4/2016 | Peters | |

OTHER PUBLICATIONS

U.S. Appl. No. 15/189,044, filed Jun. 22, 2016.
U.S. Appl. No. 15/212,337, filed Jul. 18, 2016.
U.S. Appl. No. 15/281,673, filed Sep. 30, 2016.
U.S. Appl. No. 15/417,399, filed Jan. 27, 2017.
U.S. Appl. No. 15/417,437, filed Jan. 27, 2017.
U.S. Appl. No. 15/417,602, filed Jan. 27, 2017.

* cited by examiner

COMBUSTOR HEAT SHIELD AND ATTACHMENT FEATURES

FIELD

The present subject matter relates generally to flow path assemblies of gas turbine engines. More particularly, the present subject matter relates to combustor heat shields of combustors of gas turbine flow paths and features for attaching a heat shield to a flow path assembly of a gas turbine engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Combustion gas temperatures are relatively hot, such that some components in or near the combustion section and the downstream turbine section require features for deflecting or mitigating the effects of the combustion gas temperatures. For example, one or more heat shields may be provided on a combustor dome to help protect the dome from the heat of the combustion gases. However, such heat shields often require cooling themselves, e.g., through a flow of cooling fluid directed against the heat shields, which can negatively impact turbine emissions. Further, turbine performance and efficiency generally may be improved by increasing combustion gas temperatures. Therefore, there is an interest in providing heat shields that can withstand increased combustion gas temperatures yet also require less cooling, to increase turbine performance and efficiency while also reducing turbine emissions.

Non-traditional high temperature materials, such as ceramic matrix composite (CMC) materials, are more commonly being used for various components within gas turbine engines. For example, because CMC materials can withstand relatively extreme temperatures, there is particular interest in replacing components within the flow path of the combustion gases, such as combustor dome heat shields, with CMC materials. Nonetheless, typical CMC heat shields have complex shapes that are difficult to fabricate, often requiring complex or special tooling, and are difficult to assemble with the combustor dome, usually requiring numerous intricate metal pieces to properly assemble the heat shields with the dome.

Accordingly, improved combustor heat shields and features for attaching heat shields within flow path assemblies that overcome one or more disadvantages of existing designs would be desirable. For example, a contoured heat shield for a flow path assembly would be beneficial. In particular, a contoured CMC heat shield positioned between a combustor dome and a combustion chamber of a CMC flow path assembly would be useful. Further, a collar for attaching a heat shield to a combustor dome would be helpful.

BRIEF DESCRIPTION

Aspects and advantages of the invention will be set forth in part in the following description, or may be obvious from the description, or may be learned through practice of the invention.

In one exemplary embodiment of the present disclosure, a combustor assembly for a gas turbine engine is provided. The combustor assembly comprises a flow path assembly including an outer wall, an inner wall, and a combustor dome that define a combustion chamber. Each of the outer wall, inner wall, and combustor dome are formed from a ceramic matrix composite (CMC) material. The combustor dome is positioned at a forward end of a combustor of the gas turbine engine, and the combustor dome defines a plurality of dome openings. The combustor assembly further comprises a heat shield positioned between the combustor dome and the combustion chamber. The heat shield comprises a plurality of heat shield segments. Each heat shield segment defines a heat shield aperture, and each heat shield aperture is aligned with a dome opening. The combustor assembly also comprises a plurality of fuel-air mixers; one of the plurality of fuel-air mixers is positioned through each heat shield aperture and dome opening. Additionally, the combustor assembly comprises a plurality of collars. One collar extends through each heat shield aperture to couple the heat shield to the fuel-air mixer. Further, an aft surface of each heat shield segment is concave and a forward surface of each heat shield segment is convex.

In another exemplary embodiment of the present disclosure, a combustor assembly for a gas turbine engine is provided. The combustor assembly comprises a flow path assembly including an outer wall, an inner wall, and a combustor dome that define a combustion chamber; an annular contoured heat shield positioned between the combustor dome and the combustion chamber; a plurality of fuel-air mixers; and a plurality of collars. Each of the outer wall, inner wall, and combustor dome are formed from a ceramic matrix composite (CMC) material. The combustor dome is positioned at a forward end of a combustor of the gas turbine engine, and the combustor dome defines a plurality of dome openings. The heat shield also is formed from a CMC material and has a plurality of heat shield segments. Each heat shield segment defines a heat shield aperture, and the plurality of heat shield are apertures aligned with the dome openings. Moreover, one of the plurality of fuel-air mixers is positioned through each heat shield aperture and dome opening, and one collar extends through each heat shield aperture to couple the heat shield to one of the plurality of fuel-air mixers.

In still another exemplary embodiment of the present disclosure, a ceramic matrix composite (CMC) heat shield for a flow path assembly is provided. The CMC heat shield comprises an annular body that defines a plurality of heat shield apertures. Further, the body has an inner perimeter, an outer perimeter, a forward surface, and an aft surface. The body comprises a plurality of heat shield segments, and each heat shield segment defines one of the plurality of heat shield apertures. An aft surface of each heat shield segment is concave and a forward surface of each heat shield segment is convex such that the heat shield segments form a contoured heat shield.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Generally, the present subject matter is directed to flow path assemblies for gas turbine engines that utilize one or more ceramic matrix composite (CMC) heat shields to help protect a combustor dome portion of the flow path assembly, as well as other components of the assembly. The flow path assembly may include an outer wall, an inner wall, and a combustor dome that are each formed from a CMC material. A contoured CMC heat shield may be positioned between the combustor dome and a combustion chamber, and the heat shield defines a plurality of heat shield apertures that are each aligned with a dome opening defined by the combustor dome. A plurality of fuel-air mixers, which may be a component of a fuel nozzle assembly, may be positioned in the dome openings to supply a mixture of fuel and air to the combustion chamber for combustion. One of the plurality of fuel-air mixers may be positioned through each aligned heat shield aperture and dome opening. A plurality of collars may be used to secure the heat shield to the combustor dome, e.g., one collar may extend through each heat shield aperture to couple the heat shield to the fuel-air mixer and thereby secure the heat shield with respect to the combustor dome. In exemplary embodiments, the CMC heat shield comprises a plurality of heat shield segments and is contoured such that an aft surface of each heat shield segment is concave and a forward surface of each heat shield segment is convex. Each heat shield segment may be generally rectangular in shape such that each heat shield segment has four corners, and the aft surface of each heat shield segment may comprise a high point at each corner.

Figure 1:
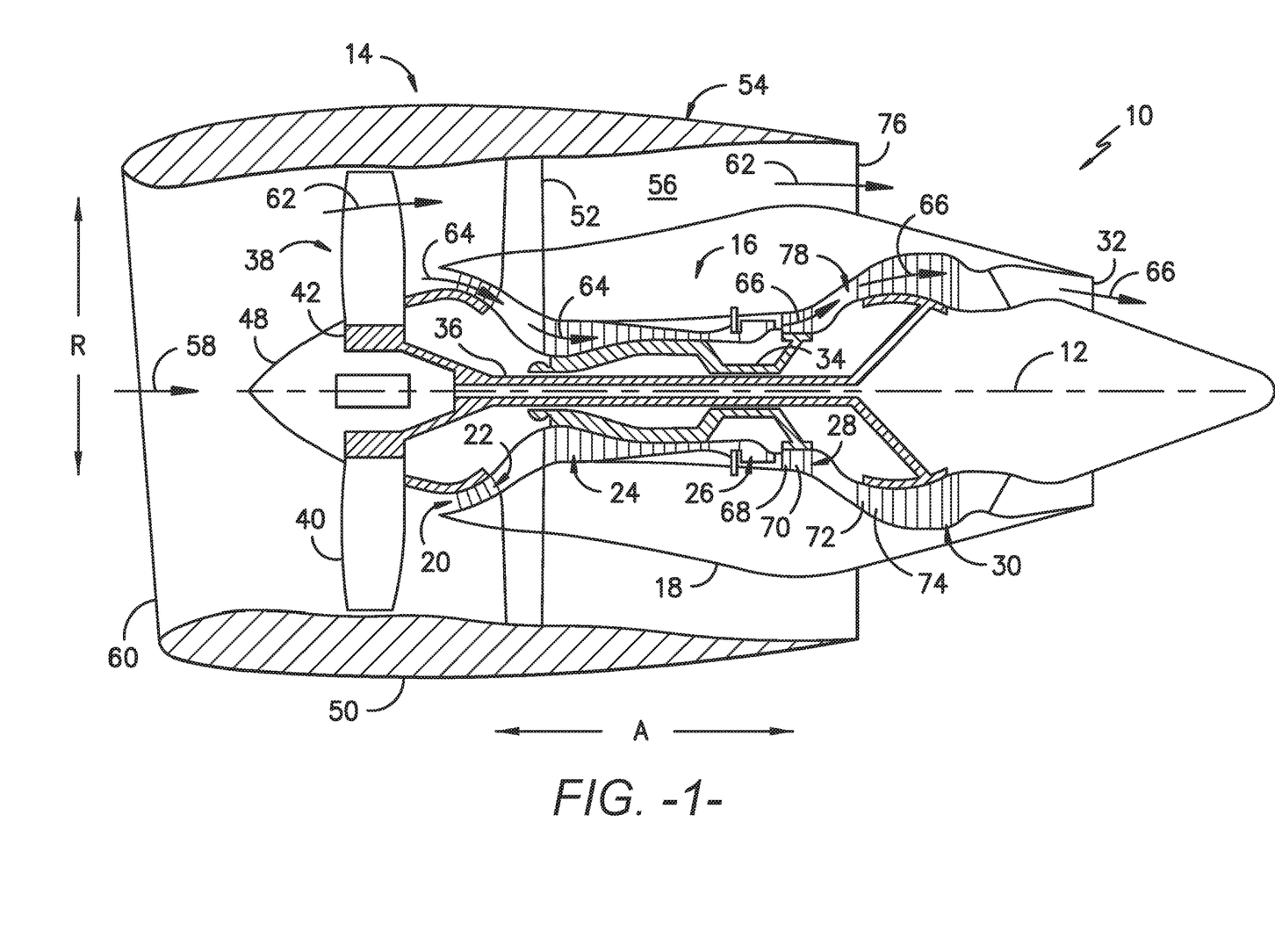
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10, particularly components within hot gas path 78, such as components of combustion section 26, HP turbine 28, and/or LP turbine 30, may comprise a ceramic matrix composite (CMC) material, which is a non-metallic material having high temperature capability. Of course, other components of turbofan engine 10, such as components of HP compressor 24, may comprise a CMC material. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYL-RAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. As an example, the combustion section 26 may include a combustor formed from a CMC material and/or one or more stages of one or more stages of the HP turbine 28 may be formed from a CMC material. However, CMC components may be used in other sections as well, such as the compressor and/or fan sections. Of course, in some embodiments, other high temperature materials and/or other composite materials may be used to form one or more components of engine 10.

Figure 2:
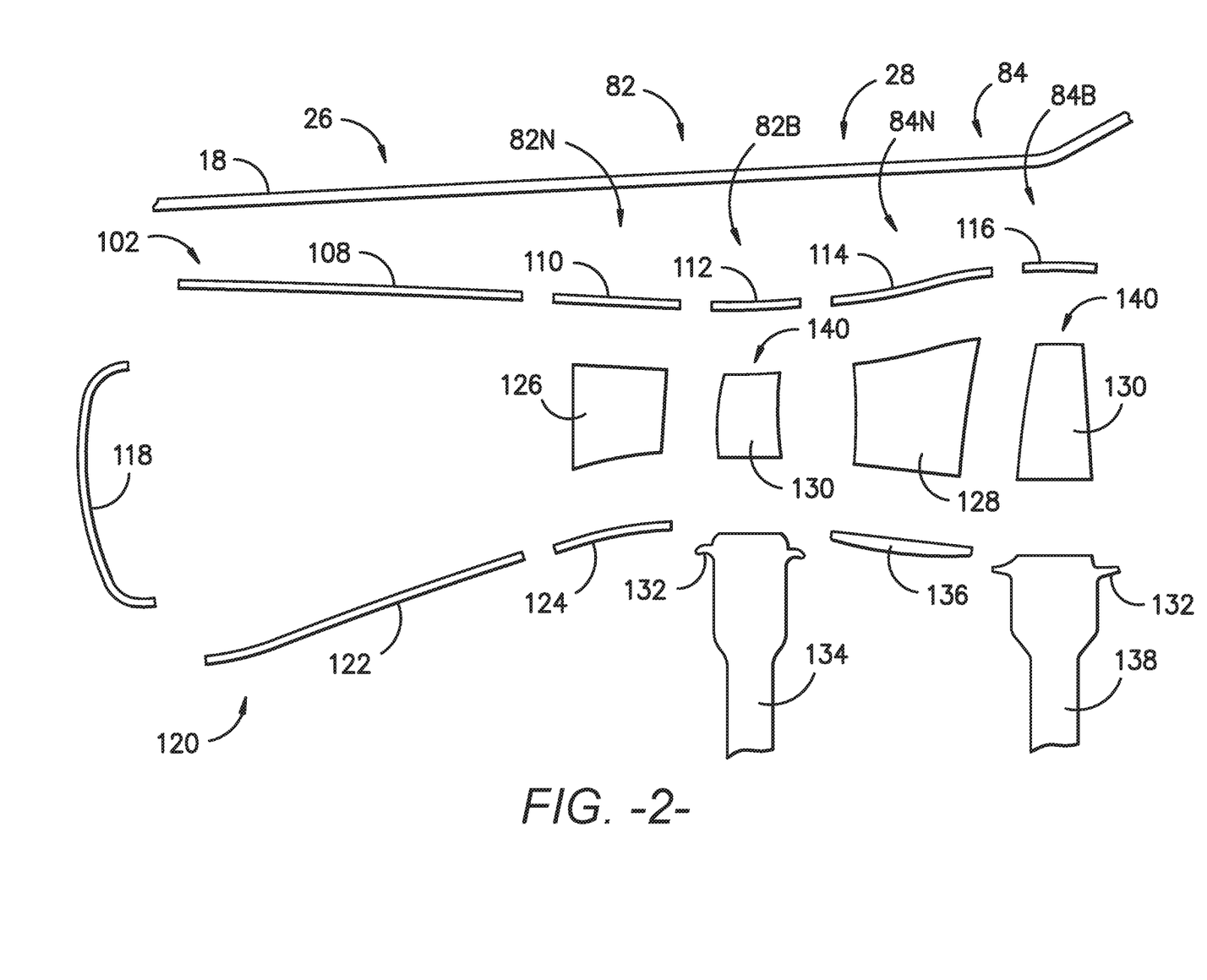
FIG. 2 provides a schematic exploded cross-section view of a combustion section and a high pressure turbine section of the gas turbine engine of FIG. 1 according to an exemplary embodiment of the present subject matter.

FIG. 2 provides an exploded view of a schematic cross-section of the combustion section 26 and the HP turbine 28 of the turbine section of the turbofan engine 10 according to an exemplary embodiment of the present subject matter. The depicted combustion section 26 includes a generally annular combustor 80, and downstream of the combustion section 26, the HP turbine 28 includes a plurality of turbine stages. More particularly, for the depicted embodiment, HP turbine 28 includes a first turbine stage 82 and a second turbine stage 84. In other embodiments, the HP turbine 28 may comprise a different number of turbine stages; for example, the HP turbine 28 may include one turbine stage or more than two turbine stages. The first turbine stage 82 is positioned immediately downstream of the combustion section 26, and the second turbine stage 84 is positioned immediately downstream of the first turbine stage 82. Further, each turbine stage 82, 84 comprises a nozzle portion and a blade portion; the first turbine stage 82 includes nozzle portion 82N and blade portion 82B, and the second turbine stage 84 includes nozzle portion 84N and blade portion 84B. The nozzle portion 82N of the first turbine stage 82 is located immediately downstream of the combustion section 26, such that the nozzle portion 82N of the first turbine stage 82 also may be referred to as a combustor discharge nozzle. Moreover, combustor 80 defines a generally annular combustion chamber 86 such that the combustor 80 may be described as a generally annular combustor.

Additionally, as described in greater detail below, a flow path 100 through the combustion section 26 and the HP turbine 28 is defined by an outer boundary and an inner boundary of a flow path assembly 101. The outer and inner boundaries form a flow path for the combustion gases 66 through the combustion section 26 and HP turbine 28; thus, the flow path 100 may comprise at least a portion of the hot gas path 78 described above. Further, in other embodiments, the flow path 100 also may extend through LP turbine 30 and jet exhaust 32; in still other embodiments, the flow path 100 also may extend forward upstream of the combustion section 26, e.g., into HP compressor 24. As such, it will be appreciated that the discussion herein of the present subject matter with respect to combustion section 26 and HP turbine 28 is by way of example only and also may apply to different configurations of gas turbine engines and flow paths 100.

As shown in the exploded view of FIG. 2, the outer and inner boundaries may be defined by an outer wall 102 and an inner wall 120, respectively, which may include several portions of the combustion section 26 and HP turbine 28. For instance, the combustor 80 includes an outer liner 108 defining an outer boundary of the flow path through the combustor 80. Each nozzle portion 82N, 84N comprises an outer band defining an outer boundary of a flow path through the nozzle portion of each turbine stage, and each blade portion 82B, 84B comprises a shroud defining an outer boundary of a flow path through the blade portion of each turbine stage. More particularly, as shown in FIG. 2, the first turbine stage nozzle portion 82N comprises outer band 110, first turbine stage blade portion 82B comprises shroud 112, second turbine stage nozzle portion 84N comprises outer band 114, and second turbine stage blade portion 84B comprises shroud 116. These portions of the combustion section 26 and HP turbine 28 may comprise at least a portion of the outer wall 102, as described in greater detail below.

Further, as illustrated in FIG. 2, the combustor 80 includes an inner liner 122 defining an inner boundary of the flow path through the combustor 80. Each nozzle portion 82N, 84N comprises an inner band defining an inner boundary of the flow path through the nozzle portion of each turbine stage, and each blade portion 82B, 84B comprises one or more blade platforms that define an inner boundary of the flow path through the blade portion of each turbine stage. More particularly, as shown in FIG. 2, the first turbine stage nozzle portion 82N comprises inner band 124, first turbine stage blade portion 82B comprises blade platforms 132, second turbine stage nozzle portion 84N comprises inner band 136, and second turbine stage blade portion 84B comprises blade platforms 132. These portions of the combustion section 26 and HP turbine 28 may comprise at least a portion of the inner wall 122, as described in greater detail below.

Moreover, in the depicted embodiment, a combustor dome 118 extends radially across a forward end 88 of the combustor 80. The combustor dome 118 may be a part of outer wall 102, may be a part of inner wall 120, may be a part of both outer wall 102 and inner wall 120 (e.g., a portion of the combustor dome 118 may be defined by the outer wall 102 and the remainder may be defined by the inner wall 120), or may be a separate component from outer wall 102 and inner wall 120. Additionally, a plurality of nozzle airfoils is positioned in each of the nozzle portions 82N, 84N. Each nozzle airfoil 126 within the first turbine stage nozzle portion 82N extends radially from the outer band 110 to the inner band 124, and the nozzle airfoils 126 are spaced circumferentially about the longitudinal centerline 12. Each nozzle airfoil 128 within the second turbine stage nozzle portion 84N extends radially from the outer band 114 to the inner band 136, and the nozzle airfoils 128 are spaced circumferentially about the longitudinal centerline 12. Further, a plurality of blade airfoils 130 are positioned in each of the blade portions 82B, 84B. Each blade airfoil 130 within the first turbine stage blade portion 82B is attached to blade platform 132, which in turn is attached to a first stage rotor 134. The blade airfoils 130 attached to the first stage rotor 134 are spaced circumferentially about the longitudinal centerline 12. Similarly, each blade airfoil 130 within the second turbine stage blade portion 84B is attached to a blade platform 132, which in turn is attached to a second stage rotor 138. The blade airfoils 130 attached to the second stage rotor 138 are spaced circumferentially about the longitudinal centerline 12. Each blade airfoils 130 extends radially outward toward the outer wall 102, i.e., the outer boundary of the flow path 100, and a clearance gap is defined between a tip 140 of each blade airfoil 130 and the outer wall 102 such that each turbine rotor 134, 138 is free to rotate within its respective turbine stage. Although not depicted, each turbine rotor 134, 138 of the HP turbine 28 is connected to the HP shaft 34 (FIG. 1). In such manner, rotor blade airfoils 130 may extract kinetic energy from the flow of combustion gases through the flow path 100 defined by the HP turbine 28 as rotational energy applied to the HP shaft 34.

Accordingly, flow path 100 through the combustion section 26 and the HP turbine 28 is defined by a flow path assembly 101 having an inner boundary and an outer boundary, and the inner and outer boundaries define the flow path for the combustion gases 66 through the combustion section 26 and HP turbine 28. Portions of the outer boundary of the flow path assembly 101 may be integrated or unified into a single piece, unitary outer wall 102 that defines the radially outer boundary of the gas flow path 100. For instance, the outer wall 102 may include a combustor portion 104 extending through a combustion section, such as combustion section 26, and a turbine portion 106 extending through at least a first turbine stage of a turbine section, such as first turbine stage 82 of HP turbine 28. The combustor portion 104 and turbine portion 106 are integrally formed such that the combustor portion and the turbine portion are a single unitary structure, i.e., a unitary outer wall 102.

The term "unitary" as used herein denotes that the associated component, such as the outer wall 102, is made as a single piece during manufacturing, i.e., the final unitary component is a single piece. Thus, a unitary component has a construction in which the integrated portions are inseparable and is different from a component comprising a plurality of separate component pieces that have been joined together and, once joined, are referred to as a single component even though the component pieces remain distinct and the single component is not inseparable (i.e., the pieces may be re-separated). The final unitary component may comprise a substantially continuous piece of material, or in other embodiments, may comprise a plurality of portions that are permanently bonded to one another. In any event, the various portions forming a unitary component are integrated with one another such that the unitary component is a single piece with inseparable portions.

In various embodiments, the outer wall 102 may include various portions of the components along the outer portion of the flow path 100 and the inner wall 120 may include various portions of the components along the inner portion of the flow path 100. For instance, in one embodiment, the outer wall 102 may be a unitary outer wall 102 where the outer liner 108, outer band 110, shroud 112, outer band 114, and shroud 116 are integrally formed, i.e., constructed as a single unit or piece to form the integrated or unitary outer wall 102. In another embodiment, the outer wall 102 may include a portion of the combustor dome 118 or may be integrated with the entire combustor dome 118 such that the combustor dome 118 and one or more portions of the outer section of the flow path 100 are a single, integral piece. In still other embodiments, the inner wall 120 may include a portion of the combustor dome 118 or may be integrated with the entire combustor dome 118 such that the combustor dome 118 and one or more portions of the inner section of the flow path 100 are a single, integral piece. For example, the flow path assembly 101 may include an outer wall 102 that comprises a radially outer portion of the combustor dome 118 and the outer liner 108, which are integrally formed from a CMC material as a single unit or piece, and an inner wall 120 that comprises a radially inner portion of the combustor dome 118 and the inner liner 108, which are integrally formed from a CMC material as a single unit or piece.

In yet other embodiments, the combustor dome 118 may not be integrated with either the outer wall 102 or the inner wall 120 in whole or in part. That is, the combustor dome 118 is a separate component from both the outer wall 102 and the inner wall 120. As such, the flow path 100 may be discontinuous between the combustor dome 118 and outer wall 102, as well as between combustor dome 118 and inner wall 120. Further, in such embodiments, the combustor dome 118 is configured to move axially with respect to the inner wall 120 and the outer wall 102 but may be attached to, and accordingly supported by, one or more fuel nozzle assemblies 90. More particularly, an axial slip joint may be formed between the combustor dome 118 and each of the outer wall 102 and the inner wall 120 such that the combustor dome 118 may move or float axially with respect to the inner wall 120 and outer wall 102. Allowing the combustor dome 118 to float relative to the outer wall 102 and inner wall 120 can help control the position of the fuel nozzle assembly 90 with respect to the combustor dome 118 and combustor 80. For example, the combustor dome 118, outer wall 102, and inner wall 120 may be made of a different material or materials than the fuel nozzle assembly 90. As described in greater detail below, in an exemplary embodiment, the combustor dome 118, outer wall 102, and inner wall 120 are made from a ceramic matrix composite (CMC) material, and the fuel nozzle assembly 90 may be made from a metallic material, e.g., a metal alloy or the like. In such embodiment, the CMC material thermally grows or expands at a different rate than the metallic material. Thus, allowing the combustor dome 118 to move axially with respect to outer and inner walls 102, 120 may allow for tighter control of the immersion of swirler 92 of fuel nozzle assembly 90 within combustor dome 118, as well as combustor 80, than if the combustor dome 118 was attached to the outer and inner walls 102, 120. Tighter control of the position of fuel nozzle assembly 90 and its components with respect to combustor 80 can reduce variation in operability and performance of engine 10.

Additionally, in embodiments in which the combustor dome 118 is separate from the outer and inner walls 102, 120, the outer wall 102 and inner wall 120 also may move axially and radially with respect to the combustor dome 118. By decoupling the combustor dome 118 from the walls 102, 120 and allowing relative movement between the walls 102, 120 and the combustor dome 118, stress coupling may be alleviated between the outer and inner walls 102, 120 and the combustor dome 118. Moreover, any leakage between the uncoupled combustor dome 118 and outer and inner walls 102, 120 may be utilized as purge and/or film starter flow.

Figure 3:
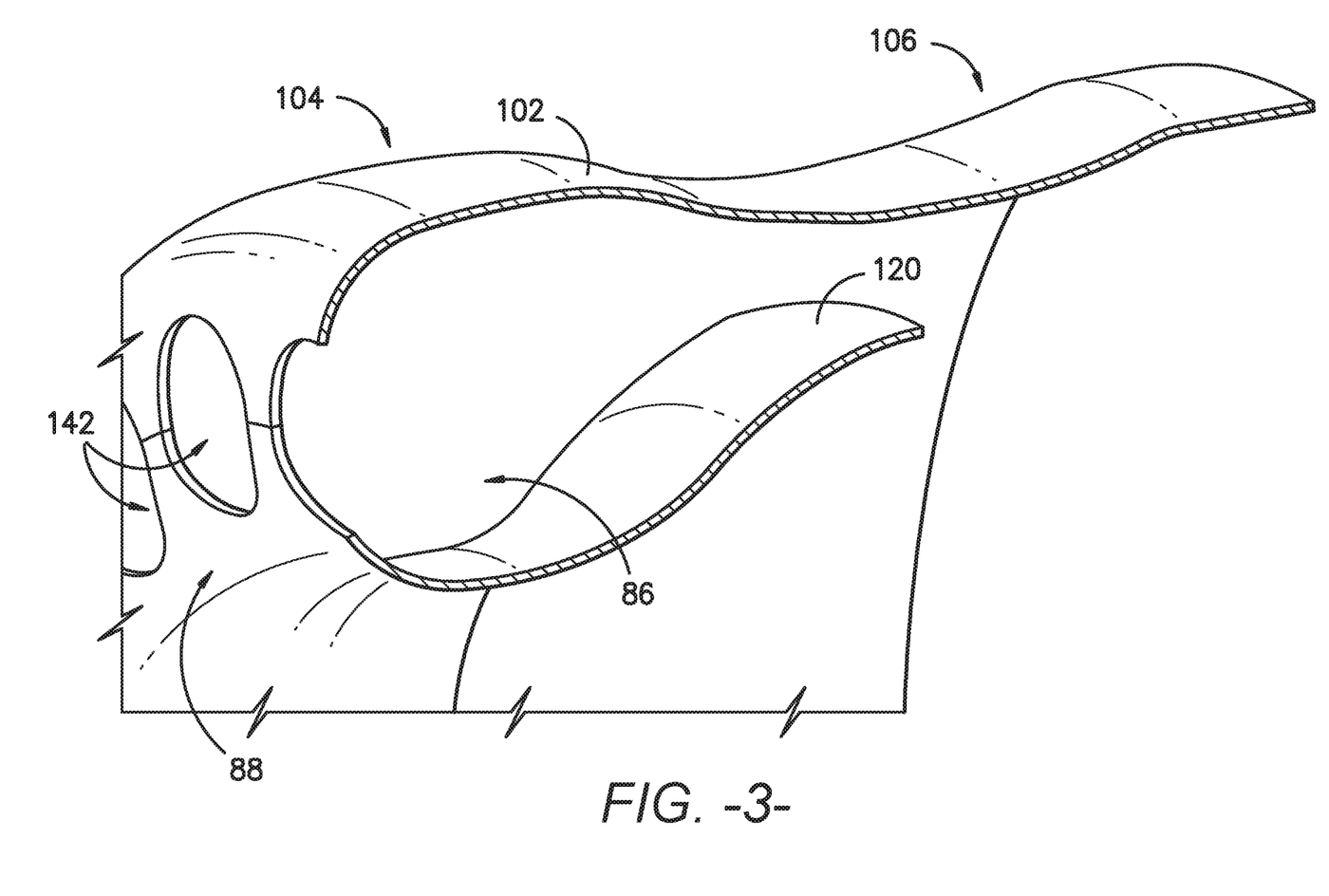
FIG. 3 provides a partial perspective view of a portion of an integral outer boundary structure and inner boundary structure of the combustion section and high pressure turbine section of FIG. 2 according to an exemplary embodiment of the present subject matter.

FIG. 3 provides a partial perspective view of a portion of an integral flow path assembly 101, having an outer wall 102 formed as a first single piece component and an inner wall 120 formed as a second single piece component. In some embodiments of the combustion gas flow path assembly 101, the outer liner 108, outer band 110, shroud 112, outer band 114, shroud 116, and a radially outer portion of combustor dome 118 are integrally formed such that the outer liner 108, outer bands 110, 114, shrouds 112, 116, and radially outer portion of combustor dome 118 are a single unitary structure. Similarly, the inner liner 122, inner band 124, and a radially inner portion of combustor dome 118 are integrally formed such that the inner liner 122, inner band 124, and radially inner portion of the combustor dome 118 are a single unitary structure. FIG. 3 further illustrates that a plurality of openings 142 for receipt of fuel nozzle assemblies 90 and/or swirlers 92 may be defined in the forward end 88 of combustor 80 of the unitary flow path assembly 101. Further, it will be appreciated that FIG. 3 illustrates only a portion of the integral flow path assembly 101 and that, although its entire circumference is not illustrated in FIG. 3, the first and second single piece components are single, unitary pieces circumferentially as well as axially. As such, the flow path assembly 101 defines a generally annular, i.e., generally ring-shaped, flow path between the outer wall 102 and inner wall 120.

Integrating various components of the outer and inner boundaries of the flow path assembly 101 as described above can reduce the number of separate pieces or components within engine 10, as well as reduce the weight, leakage, and complexity of the engine 10, compared to known gas turbine engines. For instance, known gas turbine engines employ seals or sealing mechanisms at the interfaces between separate pieces of the flow path assembly to attempt to minimize leakage of combustion gases from the flow path. By integrating the outer boundary, for example, split points or interfaces between the outer combustor liner and first turbine stage outer band, the first turbine stage outer band and the first turbine stage shroud, etc. can be eliminated, thereby eliminating leakage points as well as seals or sealing mechanisms required to prevent leakage. Similarly, by integrating components of the inner boundary, split points or interfaces between the integrated inner boundary components are eliminated, thereby eliminating leakage points and seals or sealing mechanisms required at the inner boundary. Accordingly, undesired leakage, as well as unnecessary weight and complexity, can be avoided by utilizing unitary components in the flow path assembly. Other advantages of unitary outer wall 102, unitary inner wall 120, and/or a unitary flow path assembly 101 will be appreciated by those of ordinary skill in the art.

As illustrated in FIGS. 2 and 3, the outer wall 102 and the inner wall 120 define a generally annular flow path therebetween. That is, the outer wall 102 circumferentially surrounds the inner wall 120; stated differently, the outer wall 102 extends 360° degrees about the inner wall 120, thereby defining a generally annular or ring-shaped flow path therebetween. As such, the combustor dome 118, which extends across the forward end 88 of the combustor 80, is a generally annular combustor dome 118. Further, the combustor dome 118 defines an opening 142 for receipt of a fuel nozzle assembly 90 positioned at forward end 88. The fuel nozzle assembly 90, e.g., provides combustion chamber 86 with a mixture of fuel and compressed air from the compressor section, which is combusted within the combustion chamber 86 to generate a flow of combustion gases through the flow path 100. The fuel nozzle assembly 90, or a portion thereof, may attach to the combustor dome 118 as described in greater detail below. Further, it will be understood that the combustor dome 118 may define a plurality of openings 142, each opening receiving a swirler 92 or other portion of fuel nozzle assembly 90.

As further illustrated in FIGS. 2 and 3, the flow path assembly 101 generally defines a converging-diverging flow path 100. More particularly, the outer wall 102 and the inner wall 120 define a generally annular combustion chamber 86, which forms a forward portion of the flow path 100. Moving aft or downstream of combustion chamber 86, the outer wall 102 and inner wall 120 converge toward one another, generally in the region of first turbine stage 82. Continuing downstream of the first turbine stage 82, the outer wall 102 and inner wall 120 then diverge, generally in the region of second turbine stage 84. The outer wall 102 and inner wall 120 may continue to diverge downstream of the second turbine stage 84. In exemplary embodiments, e.g., as shown in FIG. 3 and referring only to the unitary outer wall 102, the first turbine stage nozzle outer band portion 110 and blade shroud portion 112 of the outer wall 102 converge toward the axial centerline 12. The second turbine stage nozzle outer band portion 114 and blade shroud portion 116 of the outer wall 102 diverge away from the axial centerline 12. As such, the outer boundary of flow path 100 formed by the unitary outer wall 102 defines a converging-diverging flow path 100.

Figure 4:
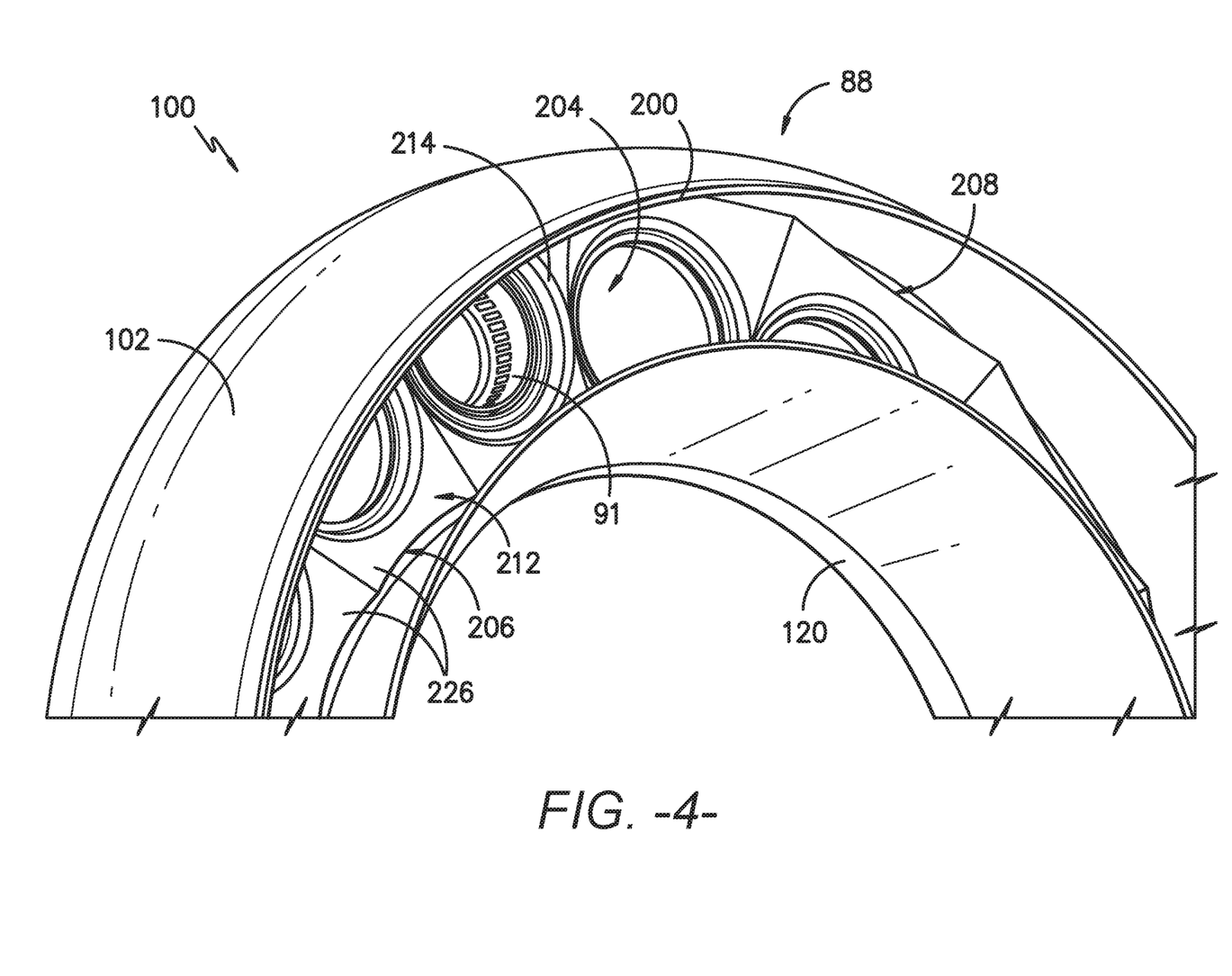
FIG. 4 provides an aft perspective view of a portion of a flow path assembly according to an exemplary embodiment of the present subject matter.

Turning now to FIG. 4, an aft perspective view is provided of a portion of a flow path assembly 101 according to an exemplary embodiment of the present subject matter. More particularly, FIG. 4 provides a perspective view of an exemplary outer wall 102 and an exemplary inner wall 120, with a heat shield 200 positioned aft of the combustor dome portion 118 of the flow path assembly. The heat shield 200 is positioned downstream or aft of the combustor dome 118 such that the heat shield 200 is positioned between the combustor dome 118 and the combustion chamber 86. The exemplary heat shield 200 is an annular heat shield that extends radially from inner wall 120 to outer wall 102. Further, the heat shield 104 extends circumferentially about the forward end 88 of combustor 80 and is configured to protect components of the turbofan engine 10, such as combustor dome 118, from the relatively extreme temperatures of the combustion chamber 86. For example, the heat shield 200 for combustor dome 118 may be formed from a CMC material to help provide protection to the dome from the heat of the combustion gases, e.g., without requiring cooling from a flow of cooling fluid as is usually required for metal heat shields.

As further illustrated in FIG. 4, the heat shield 200 comprises an annular body 202 that defines a plurality of heat shield apertures 204. Like the dome openings 142, the heat shield apertures 204 are spaced apart from one another along the circumferential direction C. The body 202 of heat shield 200 also includes an inner perimeter 206 and an outer perimeter 208. The body 202 further includes a forward surface 210 (FIG. 5) that faces the combustor dome 118 and an aft surface 212 that faces the combustion chamber 86.

Continuing with FIG. 4, a retaining collar 214 extends through each heat shield aperture 204 such that the flow path assembly 101 comprises a plurality of collars 214. As previously described, one or more openings 142 may be defined in the forward end 88 of combustor 80, e.g., in the combustor dome 118. In the embodiment shown in FIG. 4, the combustor dome 118 defines a plurality of openings 142, which are spaced apart from one another along the circumferential direction C. At least a portion of a fuel nozzle assembly 90, such as a fuel-air mixer 91 of the fuel nozzle assembly 90, may be positioned at least partially within each dome opening 142. For example, a fuel-air mixer 91 may be disposed at least partially within each dome opening 142, or within a portion of the dome openings 142. In other embodiments, the fuel-air mixers 91 may be positioned just upstream or forward of the dome openings 142. Compressed air from the compressor section of the turbofan engine 10 flows into or through the fuel-air mixers 91, where the compressed air is mixed with fuel and ignited to create the combustion gases 66 within the combustion chamber 86.

Figure 5:
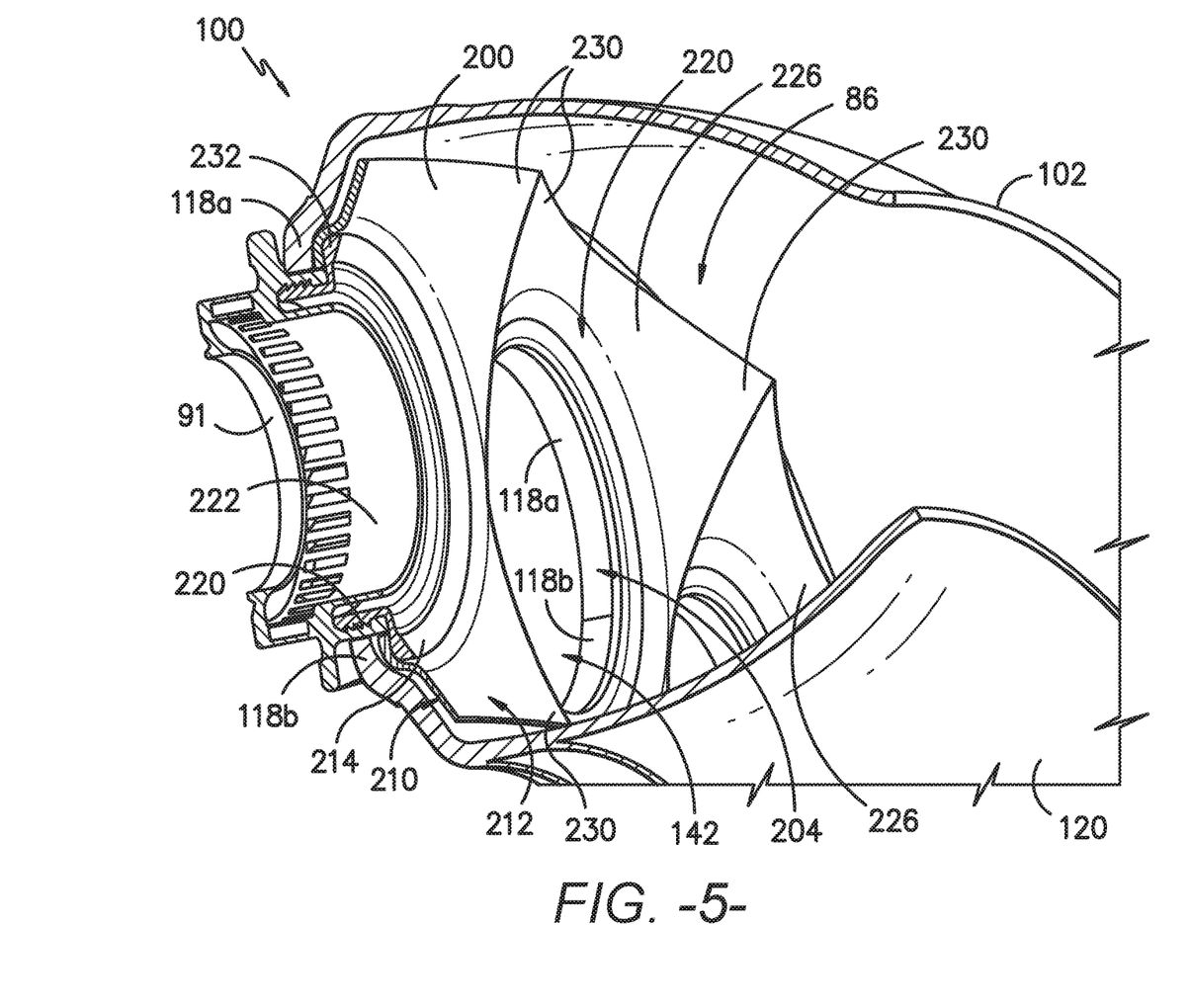
FIG. 5 provides a cross-sectional view of the flow path assembly of FIG. 4.

Turning to FIG. 5, a cross-sectional view is provided of the flow path assembly 101 of FIG. 4, where the cross-section is taken through a dome opening 142 and heat shield aperture 204. As illustrated, heat shield 200 is positioned adjacent combustor dome 118 such that a heat shield aperture 204 aligns with each dome opening 142. Further, in the depicted embodiment, a portion of the combustor dome 118 is defined by the outer wall 102 and the remainder of the combustor dome 118 is defined by the inner wall 120. More particularly, a radially outer portion 118a of the combustor dome 118 is defined by the outer wall 102, while a radially inner portion 118b of the combustor dome 118 is defined by the inner wall 120. The combustor dome 118, outer wall 102, and inner wall 120 may have other configurations as well, e.g., as described above with respect to FIGS. 2 and 3.

Referring still to FIG. 5, a retaining collar 214, which extends through the heat shield aperture 204, couples the heat shield 200 to the combustor dome 118. Moreover, although only a portion of flow path assembly 101 is shown in FIG. 5, it will be appreciated that each aperture 204 of the plurality of heat shield apertures 204 may align with an opening 142 of the plurality of dome openings 142, with a collar 214 extending through each heat shield aperture 204 to couple the heat shield 200 to the combustor dome 118.

As further illustrated in FIG. 5, the fuel-air mixers 91 may be used to couple heat shield 200 to combustor dome 118 using collars 214. More specifically, a fuel-air mixer 91 may be positioned within a dome opening 142 forward of heat shield 200, and the fuel-air mixer 91 may be threaded along a first inner surface 216 of the fuel-air mixer. Collar 214 may be threaded along an outer surface 218 of a threaded portion 220 of the collar, and the threads of collar 214 may be configured to engage the threads of fuel-air mixer 91 such that the collar 214 threadingly engages the fuel-air mixer 91. In some embodiments, such as the embodiment shown in FIG. 5, the fuel-air mixer 91 includes an inner wall 222 that projects aft, through an opening 224 defined by the collar 214. In such embodiments, the threaded portion 220 of the collar 214 is disposed between the first inner surface 216 and the inner wall 222 of the fuel-air mixer 91. Further, as shown in FIG. 5, the threaded portion 220 of collar 214 and the inner wall 222 of the fuel-air mixer 91 are each generally annular in shape. However, in other embodiments, the threaded portion 220 and inner wall 222 may have any suitable shape.

Referring to FIGS. 4 and 5, it will be appreciated that the exemplary heat shield 200 shown in the depicted embodiment is a contoured heat shield and, more particularly, a contoured CMC heat shield 200. Moreover, the heat shield 200 comprises a plurality of segments 226; one segment 226 is defined at each dome opening 142. In the illustrated embodiment, each segment is generally rectangular in shape. Additionally, each segment 226 includes a heat shield aperture 204 and defines a depression 228 that extends adjacent the heat shield aperture 204, i.e., a depression 228 surrounds the heat shield aperture 204 of each heat shield segment 226. At the depression 228, the heat shield segment 226 extends axially forward with respect to the aft surface 212 of the heat shield 200. Further, the aft surface 212 of each segment 226 of the contoured CMC heat shield 200 is generally concave, and the forward surface 210 of each segment 226 is generally convex. As such, when viewed from the aft side as in FIGS. 4 and 5, each segment 226 comprises a high point at each corner 230 of the segment, i.e., the aft surface 212 of each heat shield segment 226 has a high point at each corner 230 of the segment. The high points or protruding portions of each heat shield segment 226 may help improve combustion instability. That is, the contoured heat shield 200 may help the downstream pressure in the combustion chamber 86 remain substantially constant and not oscillate at a given operating condition. More particularly, the high points or protruding portions at corners 230, which protrude away from the combustor dome 118, may substantially eliminate aerodynamic regions that oscillate at a frequency that is harmful to the combustion chamber pressure.

Moreover, in some embodiments, the flow path assembly 101 may utilize a single piece heat shield 200 that comprises a segment 226 adjacent each dome opening 142. That is, one heat shield 200, extending in a ring adjacent the aft side of the combustor dome 118 and including the plurality of segments 226, is used in the flow path assembly 101. In other embodiments, the flow path assembly 101 may utilize multiple heat shields 200 that, together, form a ring adjacent the aft side of the combustor dome 118. Each of the multiple heat shields 200 in such embodiments may comprise one or more segments 226. For instance, a heat shield 200 may comprise one segment 226, i.e., the segment 226 may form the heat shield 200, or the heat shield 200 may comprise two or more circumferentially adjacent segments 226. Further, in some embodiments, multiple dome openings 142 may be defined adjacent to one another along the radial direction R as well as the circumferential direction C. In such embodiments, the heat shield 200 may comprise segments 226 that are radially adjacent to one another and/or circumferentially adjacent to one another, or each heat shield 200 may comprise one segment 226 that is positioned radially and circumferentially adjacent to other heat shields 200 to shield the aft side of the combustor dome 118.

Thus, it will be understood that, although illustrated with respect to one dome opening 142 and one heat shield aperture 204, the collar 214 and fuel-air mixer 91 configuration illustrated in FIGS. 4 and 5 may be used at each of the plurality of dome openings 142 and heat shield apertures 204. More particularly, in some embodiments, the flow path assembly 101 comprises a plurality of fuel-air mixers 91 and a plurality of collars 214, and each of the plurality of fuel-air mixers 91 may be threaded and each of the plurality of collars 214 may be threaded. Each collar 214 of the plurality of collars may threadingly engage one fuel-air mixer 91 of the plurality of fuel-air mixers to couple the heat shield 200 to the combustor dome 118.

Figure 6:
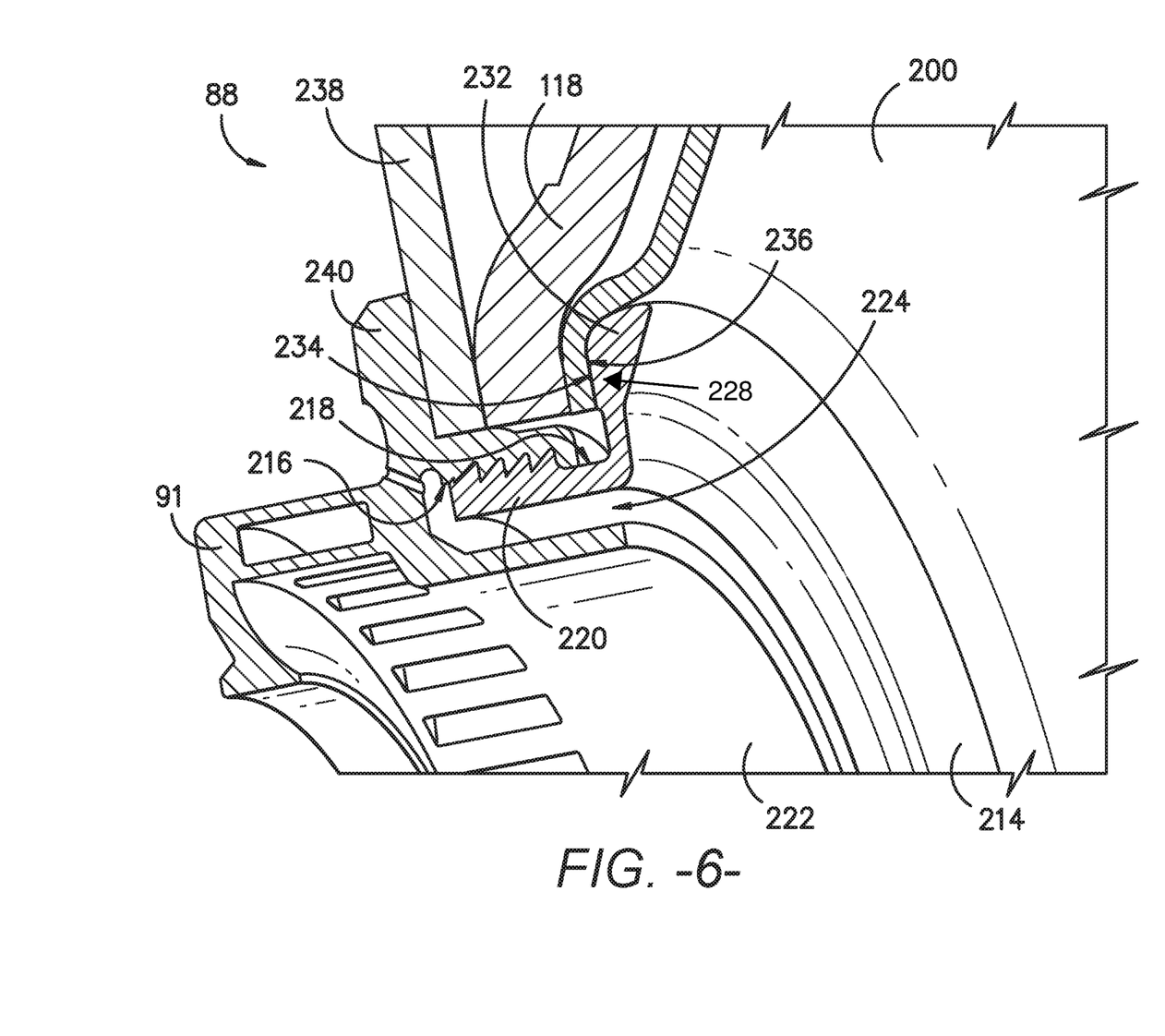
FIG. 6 provides a close-up view of a portion of the cross-section of FIG. 5.

Referring now to FIG. 6, a close-up view is provided of the cross-section of FIG. 5. As shown in FIG. 6, collar 214 includes a flange 232 that interfaces with the heat shield 200. More particularly, when the collar 214 is installed in the flow path assembly 101, the collar flange 232 seats in the heat shield depression 228. Accordingly, the flange 232 substantially fills up or occupies the depression 228. Further, the collar flange 232 defines a collar interface surface 234 that is positioned against a heat shield interface surface 236 defined by the aft surface 212 of heat shield 200. Additionally, a support member 238 may be positioned between a forward flange 240 of the fuel-air mixer 91 and the forward side of the combustor dome 118. The support member 238 may provide additional support to the fuel-air mixer 91 as well as the forward end 88 of the flow path assembly 101.

As the collar 214 interfaces with the heat shield 200, a sliding friction load may be applied at the interface surfaces, i.e., at the interface between surfaces 234 and 236. For example, as previously described, the heat shield 200 and combustor dome 118 preferably are made from a CMC material, while the collar 214 and fuel-air mixer 91 may be made from a metallic material, such as a high temperature metal alloy. In such embodiments, there is an alpha mismatch between the heat shield 200 and collar 214 and the heat shield 104 and mixer 91, as well as the combustor dome 118 and collar 214 and combustor dome 118 and mixer 91, i.e., the coefficient of thermal expansion of the CMC components is different from the coefficient of thermal expansion of the metallic components. Generally, in such embodiments, collar 214 and mixer 91 will expand at lower temperatures than the CMC combustor dome 118 and CMC heat shield 200. As the collar 214 and mixer 91 thermally expand, e.g., as the combustion temperatures increase, the collar 214 may slide on heat shield 200, giving rise to a sliding frictional load between the collar and heat shield. To combat any negative effects of movement between the heat shield 200 and collar 214, the collar interface surface 234 and heat shield interface surface 236 may be configured to bear such frictional load without damaging the heat shield 200 or collar 214. For example, in some embodiments, a wear coat may be applied to the collar interface surface 234 to minimize the effects of any sliding friction between the heat shield 200 and collar 214. Further, the heat shield interface surface 236 may be defined on a raised area of heat shield 200 to minimize any wear on the heat shield.

Although the outer wall 102 is described above as being an integral outer wall comprising, e.g., an outer liner, a first turbine stage outer band, a first blade stage shroud, a second turbine stage outer band, and a second blade stage shroud, it will be appreciated that the heat shield 200 described above may be used with an outer wall 102 and inner wall 120 that comprise any portion of the components of the flow path assembly 101. For instance, in some embodiments, the outer wall 102 may comprise a radially outer portion of the combustor dome 118 and the outer liner 108 and the inner wall 120 may comprise a radially inner portion of the combustor dome 118 and the inner liner 122. As such, the heat shield 200 may be utilized with a flow path assembly 101 that comprises an integral radially outer combustor dome portion and outer liner as well as an integral radially inner combustor dome portion and inner liner. Of course, other configurations of outer wall 102, inner wall 120, and combustor dome 118 also may utilize with the heat shield 200.

As previously stated, the outer wall 102, inner wall 120, combustor dome 118, and heat shield 200 may comprise a CMC material. For example, where the combustor portion 104 includes the outer liner 108 of the combustor 80 and the turbine portion 106 includes the outer band 110 of the first turbine stage nozzle portion 82N, the shroud 112 of the first turbine stage blade portion 82B, the outer band 114 of the second turbine stage nozzle portion 84N, and the shroud 116 of the second turbine stage blade portion 84B, the outer liner 108, outer bands 110, 114, and shrouds 114, 116 may be integrally formed from a CMC material to produce a unitary CMC outer wall 102. As described above, in other embodiments, additional CMC components may be integrally formed with the outer liner 108, outer bands 110, 114, and shrouds 114, 116 to construct a unitary CMC outer wall 102, or each of the outer boundary components may be separately formed from a CMC material. Similarly, the inner wall 120 may be formed from a CMC material. For instance, where the inner wall 120 comprises separate components, e.g., inner liner 122, inner bands 124, 136, and blade platforms 132, each component of the inner wall 120 may be formed from a CMC material. In embodiments in which two or more components are integrated to form a unitary inner wall 120, the components may be integrally formed from a CMC material to construct a unitary CMC inner wall 120. Additionally, one or more heat shields 200, e.g., for positioning adjacent the aft side of the combustor dome 118, may be formed from a CMC material to have the features described above.

Examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form a unitary structure, such as the outer wall 102 depicted in FIG. 3, as a unitary CMC component. More specifically, a plurality of plies of a CMC material may be used to form each unitary structure. The plurality of plies may be interspersed with one another to integrate the various portions forming the unitary structure. As an example, the unitary outer wall 102 of FIG. 3 may be made from a plurality of outer liner plies, a plurality of first turbine stage outer band plies, a plurality of first turbine stage shroud plies, a plurality of second turbine stage outer band plies, and a plurality of second turbine stage shroud plies. Where the outer liner plies meet the first turbine stage outer band plies, ends of the outer liner plies may be alternated with ends of the outer band plies to integrate the plies for forming the outer liner portion with the plies for forming the first turbine stage outer band portion of the unitary outer wall 102. That is, any joints between the plies forming unitary outer wall 102 may be formed by alternating plies on one side of the joint with plies on the other side of the joint. As such, the plies for forming unitary outer wall 102 may be interspersed to integrate the plies and, thereby, each portion of the unitary outer wall 102. Of course, the CMC plies may be laid up in other ways as well to form the unitary structure. In addition, laying up the plurality of CMC plies may include defining features of the unitary structure or other component (e.g., inner liner 122 when not integrated with inner band 124 to from a unitary inner wall 120 or separate combustor dome 118) such as openings 142 in combustor forward end 88, outer wall flange 144, and inner wall flange 146. Similarly, laying up the plurality of CMC plies to form one or more heat shields 200 may include defining the heat shield aperture(s) 204, depression(s) 228, and/or other features of heat shield 200 described above.

After the plurality of CMC plies are laid up to define a unitary CMC component preform, the preform is cured to produce a single piece, unitary CMC component, which is then fired and subjected to densification, e.g., silicon melt-infiltration, to form a final unitary CMC structure. Continuing with the above outer wall 102 example, the outer wall preform may be processed in an autoclave to produce a green state unitary outer wall 102. Then, the green state unitary outer wall 102 may be placed in a furnace to burn out excess binders or the like and then placed in a furnace with a piece or slab of silicon and fired to melt infiltrate the unitary outer wall 102 with at least silicon. More particularly, for unitary outer wall 102 formed from CMC plies of prepreg tapes that are produced as described above, heating (i.e., firing) the green state component in a vacuum or inert atmosphere decomposes the binders, removes the solvents, and converts the precursor to the desired ceramic matrix material. The decomposition of the binders results in a porous CMC body; the body may undergo densification, e.g., melt infiltration (MI), to fill the porosity. In the foregoing example where the green state unitary outer wall 102 is fired with silicon, the outer wall 102 undergoes silicon melt-infiltration. However, densification may be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component. The densified CMC body hardens to a final unitary CMC outer wall 102. In some embodiments, the final unitary structure may be finish machined, e.g., to bring the structure within tolerance or to define openings 142 in forward end 88, and/or an environmental barrier coating (EBC) may be applied to the unitary structure, e.g., to protect the unitary structure from the hot combustion gases 66. It will be appreciated that other methods or processes of forming CMC components, such as unitary CMC outer wall 102, unitary CMC inner wall 120, CMC heat shield(s) 200, or the like may be used as well.

Additionally or alternatively, other processes for producing unitary components may be used to form unitary outer wall 102 and/or unitary inner wall 120, and the unitary structure(s) may be formed from other materials. In some embodiments, an additive manufacturing process may be used to form unitary outer wall 102 and/or unitary inner wall 120. For example, an additive process such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering or other known process may be used to produce a unitary outer wall 102 and/or a unitary inner wall 120. Generally, an additive process fabricates components using three-dimensional information, for example, a three-dimensional computer model, of the component. The three-dimensional information is converted into a plurality of slices, each slice defining a cross section of the component for a predetermined height of the slice. The component is then "built-up" slice by slice, or layer by layer, until finished. Superalloy metallic materials or other suitable materials may be used in an additive process to form unitary outer wall 102 and/or a unitary inner wall 120. In other embodiments, a unitary outer wall 102 and/or unitary inner wall 120 may be formed using a forging or casting process. Other suitable processes or methods may be used as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A combustor assembly for a gas turbine engine, comprising:
   a flow path assembly including an outer wall, an inner wall, and a combustor dome that define a combustion chamber, each of the outer wall, inner wall, and combustor dome formed from a ceramic matrix composite (CMC) material, the combustor dome positioned at a forward end of a combustor of the gas turbine engine, the combustor dome defining a dome opening;
   a heat shield positioned between the combustor dome and the combustion chamber, the heat shield comprising a heat shield segment, the heat shield segment defining a heat shield aperture aligned with the dome opening;
   a fuel-air mixer positioned through the heat shield aperture and the dome opening; and
   a collar extending through the heat shield aperture to couple the heat shield to the fuel-air mixer,
   wherein an aft surface of the heat shield segment is concave and a forward surface of the heat shield segment is convex,
   wherein the outer wall includes a combustor portion extending through a combustion section of the gas turbine engine and a turbine portion extending through at least a second turbine stage of a turbine section of the gas turbine engine,
   wherein the combustor portion comprises an outer liner of the combustor that surrounds a flow of combustion gases through the combustor and the turbine portion comprises
      an outer band of a nozzle portion of a first turbine stage,
      a shroud of a blade portion of the first turbine stage,
      an outer band of a nozzle portion of the second turbine stage, and
      a shroud of a blade portion of the second turbine stage, and
   wherein the combustor portion and the turbine portion are integrally formed such that the combustor portion and the turbine portion are a single unitary structure made as a single piece during manufacturing such that the single unitary structure comprises a substantially continuous piece of material.

2. The combustor assembly of claim 1, wherein the collar threadingly engages the fuel-air mixer.

3. The combustor assembly of claim 2, wherein an inner surface of the fuel-air mixer is threaded and an outer surface of the collar is threaded, and wherein the threaded outer surface of the collar engages the threaded inner surface of the fuel-air mixer.

4. The combustor assembly of claim 3, wherein the fuel-air mixer further includes an inner wall that extends through an opening defined by the collar.

5. The combustor assembly of claim 1, wherein the collar defines an interface surface and the heat shield defines an interface surface adjacent the heat shield aperture, and wherein the interface surface of the collar contacts the heat shield interface surface.

6. The combustor assembly of claim 1, wherein the heat shield comprises a plurality of heat shield segments formed together as a single piece that extends in a ring adjacent an aft side of the combustor dome.

7. The combustor assembly of claim 1, wherein the heat shield segment is generally rectangular in shape such that the heat shield segment has four corners.

8. The combustor assembly of claim 7, wherein the aft surface of the heat shield segment comprises a high point at each corner.

9. The combustor assembly of claim 1, wherein the heat shield defines a depression surrounding the heat shield aperture, and wherein the collar defines a collar flange that seats within the depression.

10. The combustor assembly of claim 1, wherein the heat shield is formed from a CMC material.

11. A combustor assembly for a gas turbine engine, comprising:
- a flow path assembly including an outer wall, an inner wall, and a combustor dome that define a combustion chamber, each of the outer wall, inner wall, and combustor dome formed from a first ceramic matrix composite (CMC) material, the combustor dome positioned at a forward end of a combustor of the gas turbine engine, the combustor dome defining a plurality of dome openings;
- an annular contoured heat shield positioned between the combustor dome and the combustion chamber, the annular contoured heat shield formed from a second CMC material, the annular contoured heat shield having a plurality of heat shield segments, said each heat shield segment defining a heat shield aperture, each heat shield segment further defining a depression and an interface surface that each surround the heat shield aperture of a respective heat shield segment, each heat shield aperture aligned with a respective one dome opening of the plurality of dome openings;
- a plurality of fuel-air mixers, one fuel-air mixer of the plurality of fuel-air mixers positioned through one heat shield aperture of the plurality of heat shield apertures and one dome opening of the plurality of dome openings; and
- a plurality of collars, one collar of the plurality of collars extending through a respective one heat shield aperture of the plurality of heat shield apertures to couple the respective one heat shield to the one fuel-air mixer of the plurality of fuel-air mixers, each collar defining a collar flange that defines a collar interface surface that contacts the interface surface of a respective one heat shield segment of the plurality of heat shield segments,
- wherein the interface surface is defined within the depression such that the interface surface is recessed with respect to an aft surface of the heat shield,
- wherein an inner surface of said one fuel-air mixer of the plurality of fuel-air mixers is threaded and an outer surface of said one collar of the plurality of collars is threaded and the threaded outer surface engages the threaded inner surface, and
- wherein the fuel-air mixer includes an inner wall that extends through an opening defined by the collar such that the threaded outer surface of the collar is disposed between the threaded inner surface of the fuel-air mixer and the inner wall of the fuel-air mixer.

12. The combustor assembly of claim 11, wherein an aft surface of said each heat shield segment is concave and a forward surface of said each heat shield segment is convex.

13. The combustor assembly of claim 12, wherein said each heat shield segment is generally rectangular in shape such that said each heat shield segment has four corners.

14. The combustor assembly of claim 11, wherein said each collar flange seats within the depression of a respective heat shield aperture such that said each collar flange fills up the depression.

15. The combustor assembly of claim 11, wherein a radially outer portion of the combustor dome is defined by the outer wall and a radially inner portion of the combustor dome is defined by the inner wall.

16. The combustor assembly of claim 11, wherein the second CMC material is the same as the first CMC material.

17. The combustor assembly of claim 11, further comprising:
- a support member,
- wherein each fuel-air mixer of the plurality of fuel-air mixtures includes a forward flange positioned forward of the combustor dome,
- wherein the support member is positioned between the forward flange and a forward side of the combustor dome.

* * * * *